(12) United States Patent
Kabala

(10) Patent No.: US 7,080,061 B2
(45) Date of Patent: Jul. 18, 2006

(54) PORTABLE LOCATOR SYSTEM

(75) Inventor: Stanley J. Kabala, Fairfield, CT (US)

(73) Assignee: Hill-Rom Services, Inc., Wilmington, DE (US)

( * ) Notice: Subject to any disclaimer, the term of this patent is extended or adjusted under 35 U.S.C. 154(b) by 75 days.

(21) Appl. No.: 10/396,677

(22) Filed: Mar. 25, 2003

(65) Prior Publication Data

US 2003/0191767 A1    Oct. 9, 2003

Related U.S. Application Data

(63) Continuation of application No. 09/410,386, filed on Sep. 30, 1999, now Pat. No. 6,539,393.

(51) Int. Cl.
*G06F 17/30* (2006.01)
(52) U.S. Cl. .......................................................... 707/1
(58) Field of Classification Search .................... 707/1, 707/3
See application file for complete search history.

(56) References Cited

U.S. PATENT DOCUMENTS

| | | | |
|---|---|---|---|
| 4,279,433 A | 7/1981 | Petaja | |
| 4,495,495 A | 1/1985 | Ormanns et al. | |
| 4,495,496 A | 1/1985 | Miller, III | |
| 4,593,273 A | 6/1986 | Narcisse | |
| 4,814,751 A | 3/1989 | Hawkins et al. | |
| 4,833,452 A | 5/1989 | Currier | |
| 4,853,692 A | 8/1989 | Wolk et al. | |
| 4,899,135 A | 2/1990 | Ghahariiran | |
| 4,955,000 A | 9/1990 | Nastrom | |
| 5,006,830 A | 4/1991 | Merritt | |
| 5,062,151 A | 10/1991 | Shipley | |
| 5,086,290 A | 2/1992 | Murray et al. | |
| 5,266,944 A | 11/1993 | Carroll et al. | |
| 5,291,399 A | 3/1994 | Chaco | |
| 5,357,254 A | 10/1994 | Kah, Jr. | |
| 5,396,224 A | 3/1995 | Dukes et al. | |
| 5,396,227 A | 3/1995 | Carroll et al. | |
| 5,455,560 A | 10/1995 | Owen | |
| 5,455,851 A * | 10/1995 | Chaco et al. | ................. 379/38 |
| 5,461,390 A | 10/1995 | Hoshen | |
| 5,465,082 A | 11/1995 | Chaco | |
| 5,471,404 A * | 11/1995 | Mazer | ................... 340/825.49 |
| 5,475,367 A | 12/1995 | Prevost | |
| 5,515,426 A | 5/1996 | Yacenda et al. | |
| 5,548,637 A | 8/1996 | Heller et al. | |
| 5,561,412 A | 10/1996 | Novack et al. | |
| 5,568,119 A | 10/1996 | Schipper et al. | |
| 5,588,005 A | 12/1996 | Ali et al. | |
| 5,594,786 A | 1/1997 | Chaco et al. | |
| 5,621,388 A | 4/1997 | Sherburne et al. | |
| 5,635,907 A | 6/1997 | Bernard et al. | |
| 5,636,245 A | 6/1997 | Ernst et al. | |
| 5,650,769 A | 7/1997 | Campana, Jr. | |

(Continued)

*Primary Examiner*—Jeffrey Gaffin
*Assistant Examiner*—Haythim Alaubaidi
(74) *Attorney, Agent, or Firm*—Bose McKinney & Evans LLP

(57) ABSTRACT

A locator system and method for locating at least one of persons and objects within a facility comprises a plurality of badges, each badge having a badge transmitter that wirelessly transmits a signal including unique identification code, and a plurality of transceivers spatially dispersed within the facility, each of the transceivers having a transceiver receiver that receives signals including the unique identification code transmitted by a badge and a transceiver transmitter that wirelessly forwards the signals received from the badge to a central processor via a receiver.

18 Claims, 7 Drawing Sheets

Convention Center

U.S. PATENT DOCUMENTS

| | | |
|---|---|---|
| 5,650,770 A | 7/1997 | Schlager et al. |
| 5,682,139 A | 10/1997 | Pradeep et al. |
| 5,686,888 A | 11/1997 | Welles, II et al. |
| 5,686,902 A | 11/1997 | Reis et al. |
| 5,689,229 A | 11/1997 | Chaco et al. |
| 5,691,980 A | 11/1997 | Welles, II et al. |
| 5,699,038 A | 12/1997 | Ulrich et al. |
| 5,705,980 A | 1/1998 | Shapiro |
| 5,708,421 A | 1/1998 | Boyd |
| 5,731,757 A | 3/1998 | Layson, Jr. |
| 5,742,237 A | 4/1998 | Bledsoe |
| 5,751,246 A | 5/1998 | Hertel |
| 5,760,704 A | 6/1998 | Barton et al. |
| 5,793,290 A | 8/1998 | Eagleson et al. |
| 5,808,564 A | 9/1998 | Simms et al. |
| 5,812,056 A | 9/1998 | Law |
| 5,822,418 A | 10/1998 | Yacenda et al. |
| 5,822,544 A | 10/1998 | Chaco et al. |
| 5,838,223 A | 11/1998 | Gallant et al. |
| 5,917,425 A * | 6/1999 | Crimmins et al. ...... 340/825.49 |
| 6,009,333 A * | 12/1999 | Chaco ...................... 455/456.5 |
| 6,104,295 A * | 8/2000 | Gaisser et al. ........... 340/573.4 |
| 6,259,355 B1 | 7/2001 | Chaco et al. |
| 6,275,166 B1 | 8/2001 | del Castillo et al. |
| 6,300,880 B1 | 10/2001 | Sitnik |
| 6,308,045 B1 | 10/2001 | Wright et al. |
| RE37,531 E | 1/2002 | Chaco et al. |

\* cited by examiner

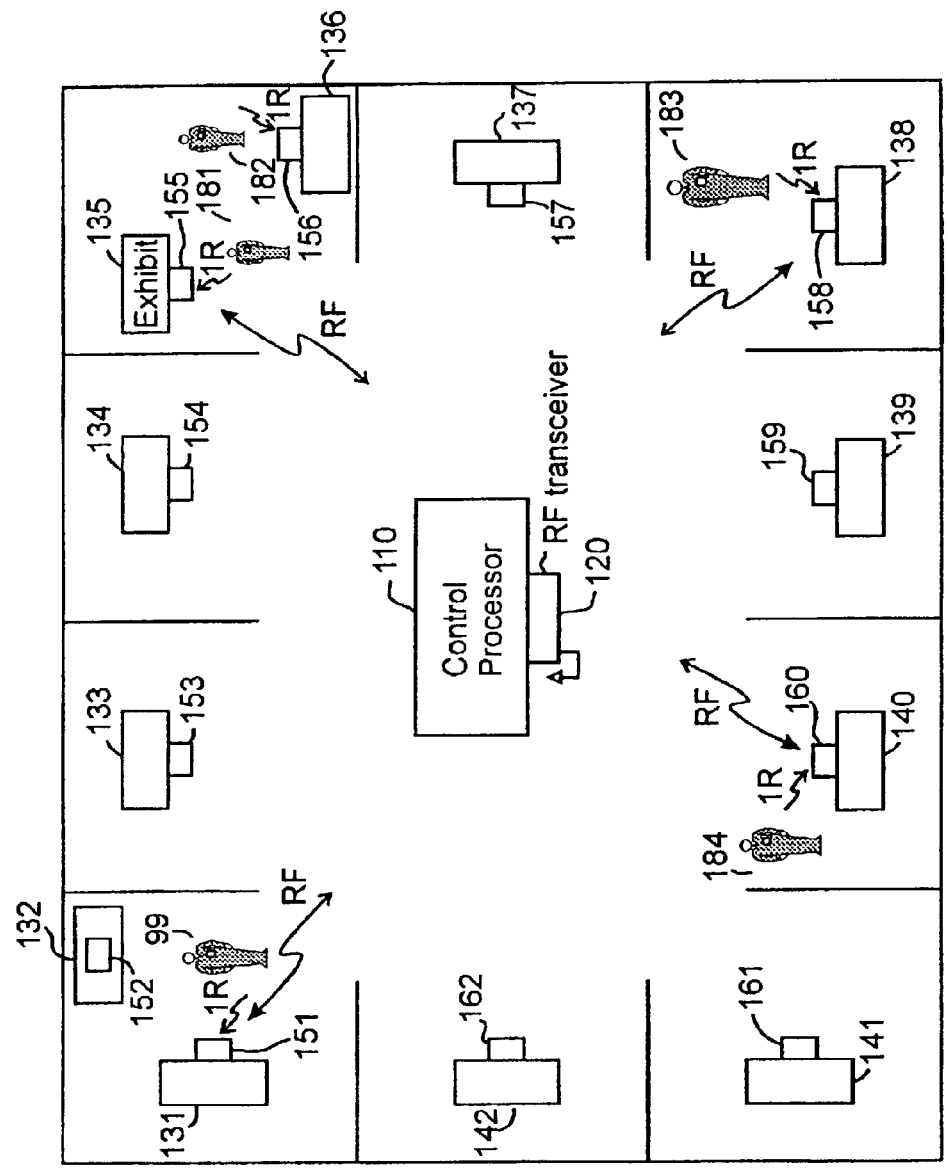

Booth 190

| Visitors | Company | Time (in) | Time (out) | Product A | Product B |
|---|---|---|---|---|---|
| John A. | ABC | 11:20 | 11:40 | 11:30 | 11:40 |
| Bill B. | XYZ | 10:10 | 10:40 | 10:35 | 10:40 |
| Sharon C. | TUV | 15:15 | 15:16 | — | 15:16 |
| — | — | — | — | — | — |
| — | — | — | — | — | — |
| — | — | — | — | — | — |
| Peter Z. | XYZ | 12:12 | 13:05 | 12:40 | 13:00 |

ARCHIVAL

| Name | Company | Dates of Visit | Duration | Number of Visits |
|---|---|---|---|---|
| John A. | ABC | 9/14 | 20 | 1 |
| Bill B. | XYZ | 9/14 | 30 | 2 |
| Sharon C. | TUV | 9/14 | 1 | 1 |

Convention Reports

FIGURE 5

Cart 200

| Aisles | Time (in) |
|---|---|
| 1. Diary | 10:10 |
| 2. Candies | 10:16 |
| 3. Soups | 10:18 |
| 4. Bakery | 10:28 |
| 5. Produce | 10:38 |
| 6. Canned items | 10:48 |
| 7. Checkout | 11:03 |

| Cart | Produce Duration | Canned Duration | Checkout Duration |
|---|---|---|---|
| 200 | 10 min. | 25 | 5 |
| 220 | 15 min. | 6 | 3 |
| 210 | 3 min. | 14 | 1 |
| 206 | 2 min. | 11 | 7 |

FIGURE 6

PORTABLE LOCATOR SYSTEM

This application is a continuation of U.S. application Ser. No. 09/410,386, filed on Sep. 30, 1999, now U.S. Pat. No. 6,539,393, the disclosure of which are incorporated herein by reference.

BACKGROUND AND SUMMARY OF THE INVENTION

The present invention generally relates to a portable locator system and more particularly a portable locator system for facilitating collection of information relating to visits by persons or objects at different locations within a facility.

Market analysts and sellers of goods and services make extensive use of data relating to the behavior of their purchasers to better target and market their goods and services. Data relating to consumer traffic is one purchaser behavior data used to gauge the attractiveness of the goods or services offered for sale. For example, data such as frequency and duration of visits to Internet websites where goods and services are offered is useful data for the seller marketing their goods.

For the operators of supermarkets and other large retail establishments, it may be important to know the traffic pattern of the shoppers, such as the frequencies of visits to certain isles and the duration of visits at certain types of goods or at locations where particular brands of goods are shelved.

In a tradeshow setting, exhibitors would like to know how often and for how long are visits to their booths to gauge the appeal to buyers of their goods. If available, the identity of the persons visited and the companies they belong to are valuable information to the sellers. Exhibitors often ask for visitors' business cards or use other techniques such as offer novelty gifts to entice visits by attendees so that the information can be collected. The identity and company information can be used by the marketer to follow up on the visitor's interests or to identify visits by competitors. When such information is coupled with the frequencies and durations of visits, the marketer can better gauge the level of interests in the marketer's product(s). When exhibitors display several products, it would also be helpful to know which of the products the attendees visited and for how long.

Shopper profiling software is now readily employed by Internet website operators to profile visitors to their sites. Operators of online shopping sites employ software to collect shopper traffic information such as which pages of product information were browsed, their viewing durations, frequencies, and types of goods browsed or purchased. With such information, the sellers can better solicit similar types of goods to the identified shoppers. Email solicitations seen to the target shopper are now common occurrences.

In a physical setting, a locator system can be used to collect information such as the identity of individuals, locations of visits by the individuals, and the durations of stays at different locations. Exemplary location systems are described in U.S. Pat. No. 5,515,426 to Yacenda, U.S. Pat. No. 5,455,851 to Chaco, and application Ser. No. 60/119,268, filed by John Chaco on Feb. 9, 1999. The disclosures in their entirety in these patents and patent application are incorporated by reference herein.

As can be seen from the above patents, a locator system for locating persons or objects within a facility includes portable badges worn by persons or objects which transmit identification information to receivers at fixed locations. A central processor collects the identification information from the receivers to determine the locations of the persons or objects. Typically, a receiver is installed in each room of the facility. Each receiver is connected by wire to the central processor. It can be appreciated that installation of a locator system requires considerable wiring, planning, and time. Once installed, reconfiguration of the system can be costly and difficult.

Therefore, a need exists for a locator system which can be portable, affording ease of installation and changes in system configuration, for collecting location and traffic information in facilities requiring frequent configuration changes.

A locator system of the present invention is provided for locating objects within a facility, comprising a plurality of badges, each having a badge transmitter for wirelessly transmitting a unique identification code, a database for storing a list of each badge, its identification code and a person or an object associated with each badge, and a plurality of transceivers spatially dispersed within the facility, each of the transceivers having a transceiver receive for receiving the identification code and a transceiver transmitter for wirelessly forwarding signals to a central processor, the signals including the unique identification code received from said badges, wherein the central processor determines from the signals received from the transceivers the location of the person or object.

Preferably, the central processor determines from the signals received from the transceivers the time the identification codes were received, by which transceivers, and the durations of receipt of the same identification code by each transceiver. The central processor preferably also generates a database listing the persons or objects located, locations visited by the persons or objects, and the duration of each visit.

In one embodiment of the system of the present invention, each of the transceivers receives in infrared the unique is identification codes from the badges and the transceivers transmit the signals to the central processor in RF.

In another embodiment, a plurality of transceiver modules are connected to the central processor through a local area network.

A method is also provided for collecting location data within a facility comprising the steps of: associating each of a plurality of objects or persons to a respective one of a plurality of badges; each of the badges having a unique identification code; wirelessly transmitting from each of said plurality of badges the unique identification code; receiving at transceivers within range of reception the unique identification code; wirelessly transmitting from the transceivers signals to a central processor, the signals including the unique identification code of the badge and its own identification code; determining from the signals received from the transceivers the locations of the transceivers and badges, and maintaining at the central processor, a list of objects or persons associated with respective badges and the locations of the objects or persons traveled within the facility.

In one embodiment, signal strength information relating to transmissions received from the badges is used to discriminate a transceiver closer to the transmitting badge. The central processor includes a RF transmitter for transmitting interrogation signals to each of the plurality of transceivers.

In still another embodiment, a portable locator system is provided for locating objects within a facility comprising a plurality of wireless transmitters, each having a unique identification code, for periodically transmitting the identification code, at least one wireless transceiver for receiving within its reception range the identification code transmitted from each of the wireless transmitters and for transmitting a message including the identification code of the wireless transmitter and identification code of said wireless transceiver, and a plurality of transceiver modules for receiving the message from the wireless transceiver and transmitting signals to a central processor, the signals including the identification codes of the wireless transmitter and the wireless transceivers wherein the central processor determines the locations of the wireless transmitters from the signals. The wireless transmitters and the wireless transceiver transmit in RF.

The system further includes memory for storing a list of each of the wireless transmitters, its identification code, identification of a person or an object associated with each of the wireless transmitter, and locations and times of travel. Another listing includes names of persons or identification of objects associated with each of the wireless transmitters, products associated with the at least one wireless transceiver having received transmissions from the wireless transmitters, and times and durations of the reception.

BRIEF DESCRIPTION OF THE DRAWINGS

Preferred embodiments of the invention are described herein below with reference to the drawings wherein:

FIG. 1 illustrates an embodiment of the locator system according to the present invention configured for a convention center setting;

FIG. 5 is an exemplary listing of the traffic data collected from the system of FIG. 1; and FIG. 6 is an exemplary listing representing data collected from the system of FIG. 2.

DETAILED DESCRIPTION OF PREFERRED EMBODIMENTS

Figure 1A:
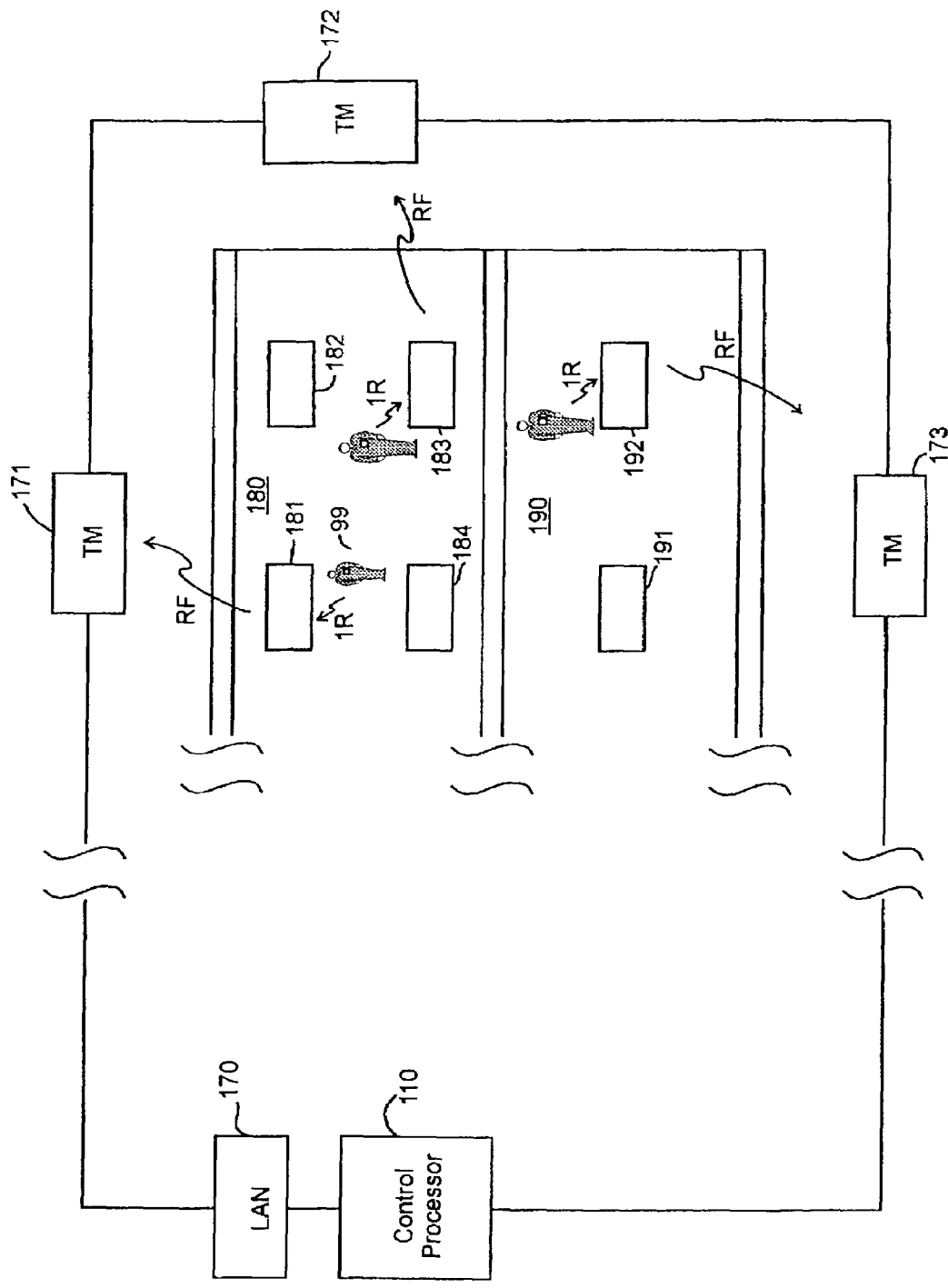
FIG. 1A illustrates another embodiment of the locator system in a convention center setting.

Generally, a locator system according to the present invention includes a central processor, a plurality of portable transceivers, and a plurality of portable badges. Each of the plurality of badges transmits a unique ID code, preferably in infrared, substantially periodically and continuously. Each of the plurality of transceivers includes an infrared receiver for receiving transmissions of the ID codes from badges within receiving range of the transceiver. In one embodiment, each of the transceivers also includes a wireless transmitter, which preferably transmits signals in RF, for forwarding signals to the central processor. The transceivers thus receive and transmit signals wirelessly, affording portability and mobility. The central processor includes an RF transceiver for receiving signals transmitted from the portable transceivers.

In another embodiment, transceiver modules are connected in a local area network to central processor. The transceiver modules are dispersed at locations throughout a facility. Transceiver modules receive signals from the portable transceivers, then relay badge, transceiver, and transceiver module IDs to the central processor via the LAN. The ID signals are processed by the central processor to determine, among other things, the locations of the badges.

Advantageously, the portable badges and transceivers facilitate ease of system installation and reconfiguration. Thus, the embodiments of the system according to the present invention are well suited for use in facilities which require frequently changed physical settings, such as in a convention center wherein tradeshows are frequently held and physical configurations of exhibits are changed depending upon the different types of shows.

FIG. 1 illustrates an exemplary embodiment of the locator system configured for a convention center/trade show. A plurality of transceivers 151 to 162 are disposed in the various booths set up at the various locations of the facility. At some booths, more than one transceivers are used to provide better coverage for different products. For example, transceivers 151, 152, 155, and 156 are used for such purpose. When attendees of the show register its attendance, they are given name tags to identify themselves. This is a customary practice and the attendee's name and his place of employment is usually indicated on the name tag. With the present system, a portable badge can be given or embedded in the name tag. The badges have been preassigned with a unique ID. The provider or organizer of the trade show will upon an attendee completing his registration information, associate the badge with the attendee by inputting the person's name and company information and the badge ID information associated with the person. Preferably, the badges transmit its ID code at a modulation frequency of about 455 Khz. The code is sent about every four seconds. Each badge transmits periodically and substantially continuously its identification code in infrared. Each transceiver is capable of receiving the badge data when the badge transmitters are in the transceiver's reception range. The transceivers detect, digitize and process the received infrared signals and transfers the processed information to the central processor 110 by RF communication. The central processor 110 includes a RF transceiver 120 including an RF receiver for receiving RF transmissions from transceivers 151 to 162.

Advantageously, because transceivers 151 to 162 receive and transmit wirelessly, e.g., receives in infrared and transmits in RF, installation of the transceivers can be simply by placement of the transceivers at the locations requiring locator coverage. The laborious, costly, and time consuming hardwired installations of transceivers are rendered unnecessary. Further, if the configuration of the trade show changes, such as changes necessary in the layout of the booths, the locator system configuration can easily be changed by moving the portable transceivers with the changed booths.

Referring again to FIG. 1, when each attendee walks or attends different booths of the trade show, transceivers 151 to 162 in each booth receives the identification code of the badge carried by the attendee. The identification information, along with the transceivers' own identification codes, and the signal strength of the signals received from the badges, are forwarded by the transceivers to the central processor 110. The RF transceiver 120 of central processor 110 receives the ID information in RF and central processor 110 processes and sorts the information into which of the transceivers were visited by which badge, when and for how long. Then, the central processor retrieves the information entered by operators when the attendees registered for the show to archive a list having identity of the attendees, the places of booths visited, the times of the visits, and the durations of the visits.

In the embodiment shown in FIG. 1, communications among the transceivers 151 to 162 and the RF transceiver 120 of central processor 110 can be by polling by central processor 110, or by automatic and periodic transmission from each of transceivers 151 to 162. In the polling scheme, each of transceivers 151 to 162 is interrogated in sequence by central processor 110 via interrogation signals sent from RF transceiver 120. The interrogation signal includes a request and a transceiver address. Upon receipt of a matching address, the respective transceiver responds to the request with a transceiver signal packet. The packet includes its own ID, the identification code(s) received from badge(s) within its reception range, and the signal strengths of the badge signals. The reception range of transceivers 151 to 162 in infrared is preferably 5 to 15 feet. The reception range of RF transceiver 120 of central processor 110 is preferably around 300 feet. The RF transmissions for transceiver 151 to 162 is preferably around 900 Mhz. The signal strength information is used to decipher which of the neighboring transceivers, such as 155, 156, received a stronger transmission from the same badge. Central processor 110 interprets the stronger signal strength level information as the closer of the two transceivers to the attendee. Central processor 110 processes the transceiver packets and tracks each attendee by time-stamping each transceiver packet having a new badge ID signal. Thus, the duration of each visit of each attendee at a particular transceiver can be derived by subtracting the time of initial reception of badge ID at the particular transceiver from the time of initial reception of the same badge ID at the next transceiver, and so on.

In the periodic transmission mode, each transceiver 151 to 162 transmits a transceiver packet, substantially as described above for the polling-mode, about every four seconds, to RF transceiver 120 of central processor 110. Central processor 110 includes stored program and associated memory for processing and time stamping the received packets as described above to track each attendee. Further descriptions of the components and operations of the central processor 110, RF transceiver 120 and transceivers 151 to 162 are provided below and in FIGS. 3, 4A and 4B.

FIG. 1A shows an alternative embodiment of the locator system in a tradeshow setting. As shown, booths 180 and 190 each has multiple transceivers 181 to 184 and 191 and 192 disposed in respective booths to better discriminate visits by show attendees to different products displayed at their booths. For example, at booth 180 transceivers 180 to 184 are used to cover four different products. It is known to one skilled in the art that in infrared communications, infrared receivers receive only "line of sight" transmissions from the badges, unless the transmissions are reflected off reflecting surfaces. As such, when the attendees view a product, he typically faces the product and transmissions from his badge on the name tag are received by the respective transceiver disposed proximal to that product. The transceivers send the signal strength received from the badge transmissions. If multiple transceivers report receiving the same badge ID code, the signal strength indication could be used to better discriminate the location of the attendee. Transceivers 181 to 184 and 190 and 192 wirelessly transmit, preferably in RF, message packets including data relating to ID codes received from badges, signal strengths, and its own ID to a nearby wired transceiver module 171, 172 or 173. The wired transceiver modules are connected to central processor 110 via a local area network (LAN) 170. The wired transceiver modules 171 to 173 then in turn forwards the message packets received from transceivers 181 to 184 or 191 and 192 to the central processor 110 via LAN protocol known to one skilled in the art.

In the configurations of the locator system shown in FIGS. 1 and 1A, the central processor 110 processes the information received from the transceivers or transceiver modules and creates a database detailing visitor and traffic information such as shown in FIG. 6. In the case of the system shown in FIG. 1, central processor 110 preferably retrieves information from transceivers 151 to 162 by interrogating each transceiver in turn with an interrogation or request signal sent from RF transceiver 120 to each transceiver. As earlier described, upon receipt of the request signal from central processor 110, each transceiver recognizes its identification and responds by forwarding the message stored in its respective memory. When a badge ID first appears in the message received from a transceiver, the processor time stamps the receipt of the badge at the respective transceiver. For example, transceiver 151 first receives badge transmissions from attendee 99. Central processor 110 interrogates each transceiver substantially in a periodic fashion. When attendee 99 moves to another booth, the corresponding transceiver in that booth will pick up its badge ID signal and will be seen by central processor 110 when the respective transceiver is interrogated. When central processor 110 detects the first message from another transceiver which includes the badge ID from attendee 99, central processor 110 time stamps the message and logs in its database the duration of time of the visit of attendee 99 at booth 131 by subtracting the two time stamp information. The time stamping process as described for attendee 99 at booth 131 is repeated by central processor 110. In such fashion, a log is kept on each attendee by central processor 110. It can be readily appreciated by one skilled in the art that instead of an interrogation/reply type of messaging from between central processor and the transceivers 151 to 162, an interrupt driven communication method could be employed. For example, the reporting data from the transceivers 151 to 162 can be kept in short bursts, the messages reported from transceivers 151 to 162 can be reported asynchronously, whenever badge ID codes are received by the transceivers. In such case, the central processor 110 employs an interrupt driven system, wherein a message received from a transceiver causes an interrupt to alert central processor 110 to receive such message. Keeping the messages in short bursts minimizes message collision; however, collision discrimination programs may need to be employed to discriminate and resolve the message collisions.

In the configuration as shown in FIG. 1A, badge transmissions from attendees are received by the closest transceivers 181 to 184 or 191 and 192. The badge IDs are relayed to the most proximal transceiver module, for example, transceiver 181 to transceiver module 171, preferably in RF. The badge ID of attendee 99 and transceiver 181 are temporarily stored at transceiver module 171. Central processor 110 retrieves the information stored at transceiver modules 171 to 173 through LAN 170 by known LAN communications protocol, such as, token ring.

Central processor 110 processes the information from transceiver modules 171 to 173 including time stamping the badge ID data as described for the system of FIG. 1 to produce a database for attendee traffic.

It can be seen from the configurations of the locator system shown in FIGS. 1 and 1A that the transceivers 151 to 162 in FIG. 1 and 181 to 184 and 191 to 192 in FIG. 1A can be easily moved to a location convenient to cover a product or a booth. The portability and wireless communications capability of the transceivers facilitate virtual instantaneous installation and flexible placement to cover different areas or products. The LAN based transceiver modules 171 to 173 shown in FIG. 1A are shown as connected to a LAN, which also provide flexibility because the transceiver modules need not be fixed at a certain location. This is because the RF communications is achievable without a line of sight transmit and receive. Thus, the transceiver modules 171 to 173 can be as flexible as the LAN wiring.

Figure 2:
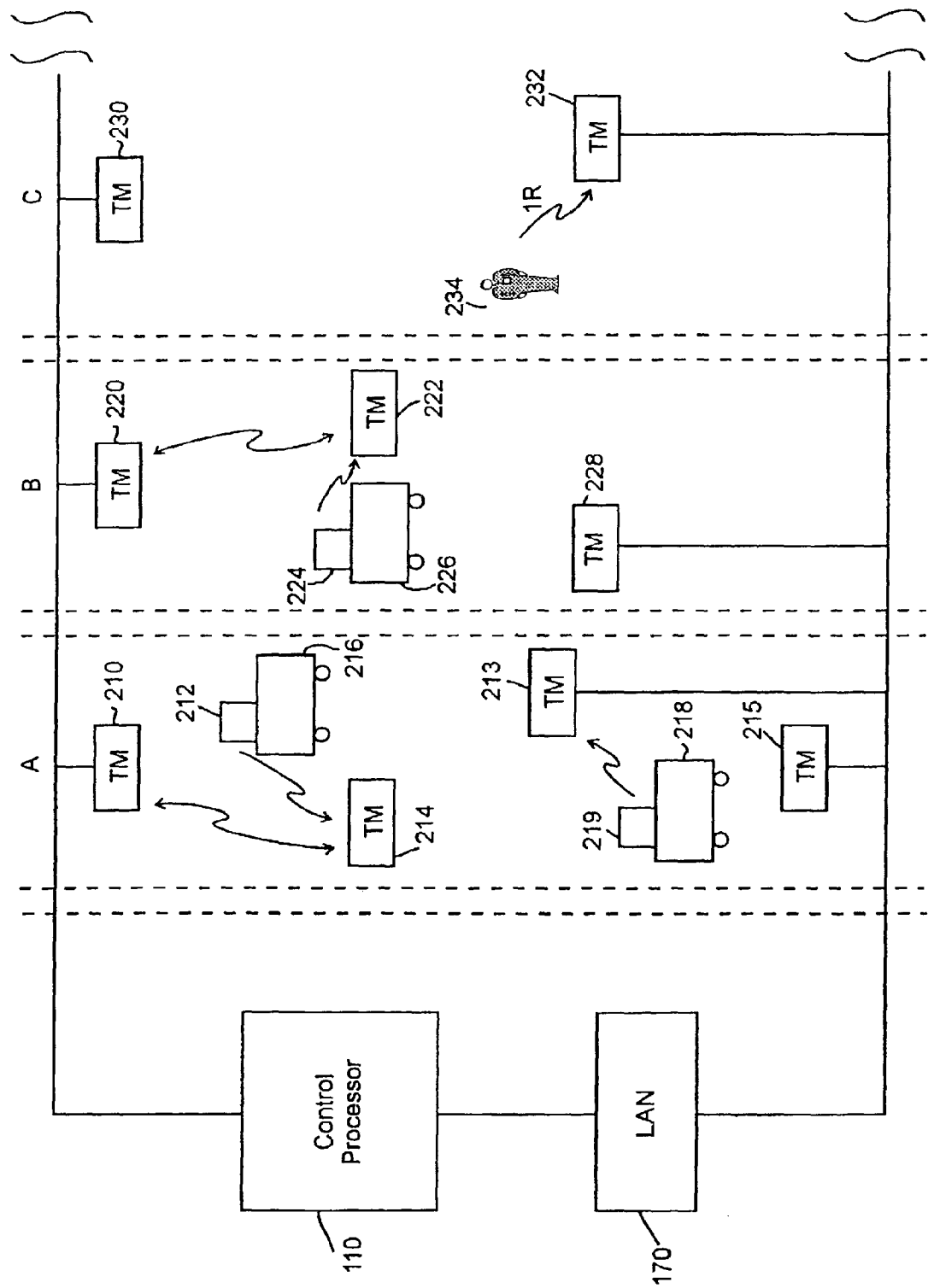
FIG. 2 illustrates a configuration of the locator system in a supermarket.

FIG. 2 shows another embodiment of the locator system of the present invention in a supermarket setting. A plurality of transceiver modules are spatially dispersed throughout the isles 'A', 'B', 'C' of the supermarket. A plurality of shopping carts are equipped with transceivers which when activated, periodically transmit transceiver ID signals to transceiver modules (TM) within their reception range. The transceiver modules are connected to central processor 110 through local area network 170. In addition to LAN based TMs, portable or wireless transceiver modules 214 and 222 are also used. The portable TMs 214 and 222 relay information received from cart transceivers 219 or 224 to the LAN based TMs. As shown, isles ABC have different transceiver modules covering different sections of the supermarket. For example, isle A can be the produce section, isle B can be the canned goods section, and isle C can be the bakery. A plurality of transceiver modules 210, 213, 214 and 215 cover different areas of the produce section in isle A. As shopping carts 216 pass through isle A, transmissions from transceivers 212 and 219 are received by TM 210, 213, 214, or 215 disposed about the isle. When cart transceiver ID signals are received by portable TM 214, transceiver module 214 receives transceiver ID information from transceiver 212, transceiver module 214 relays the received information to transceiver module 210, which in turn forwards a packet which includes IDs of cart transceiver 212 and portable TM 214 and its own ID information to central processor 110 through LAN 170. When cart transceiver 219 signals are received by transceiver modules connected to LAN 170, such as transceiver module 210, the cart transceiver ID information and the transceiver module 210 ID information can be forwarded to central processor 110 directly through LAN 170. In the present embodiment, the portable and LAN based TMs preferably communicate in RF. Each transceiver module includes an infrared receiver to receive infrared transmissions from portable badges for locating individuals wearing portable badges. Typically, an employee of the supermarket 234 wears an ID badge which transmits infrared to transceiver module 232.

Central processor 110 processes packets received from the LAN based TMs and tracks each shopping cart at the first instance a shopping cart transceiver ID is reported from any transceiver modules. At such reception, central processor 110 time stamps the reception and also may time stamp a signal received which indicates that the same shopping cart has moved out of range of the same transceiver module. Alternatively, duration of visit information can be collected by time stamping receipt of same transceiver ID at a next transceiver module, essentially as explained for the system of FIGS. 1 and 1A. In such fashion, each shopping cart is monitored as to which isles were visited, which products or product groups were visited and the durations of the visits. Conveniently, the locations of the employees and the amount of time spent at which areas are also determined and recorded. FIG. 6 shows a representative database listing of the supermarket records collected from the locator system.

Advantageously, with the use of the illustrative locator system, changes in products, positioning of the products, or promotional displays can be made and the impact on traffic flow observed and recorded. Archived reports can be generated for further analysis at other times.

Figure 3:
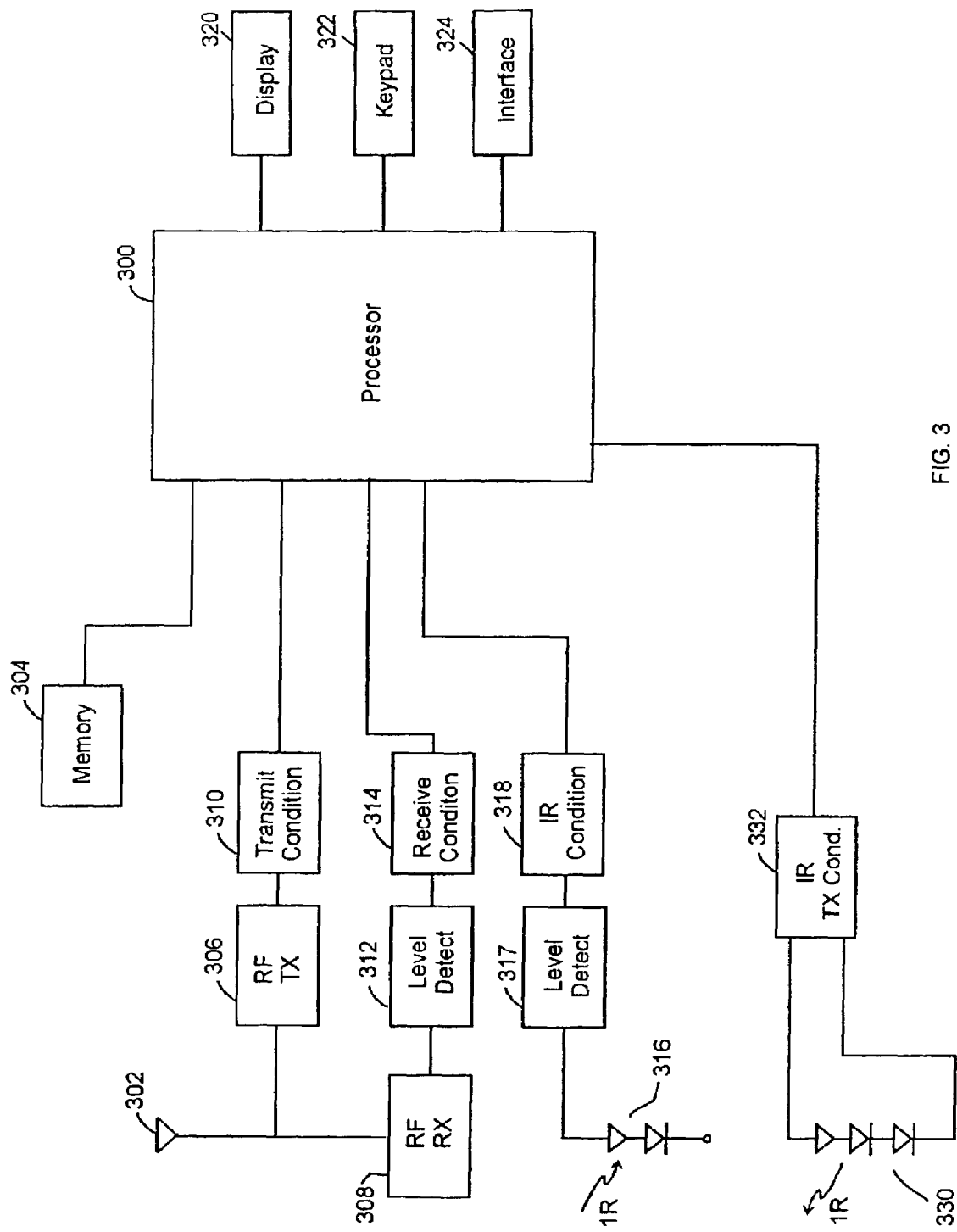
FIG. 3 illustrates an overall block diagram of a transceiver module according to the present invention.

FIG. 3 shows the major components of a transceiver module according to the present invention. Processor 300 and associated memory 304 includes stored programs for operating and controlling the operations of the transceiver module. Memory 304 also stores its own ID code. Each transceiver is capable of transmitting and receiving in radio frequency RF and infrared. A transmit conditioner 310 conditions the data, including converting and modulating where necessary the data output from processor 300. RF transmitter 306 amplifies and drives the conditioned signal from transmit conditioner 310 for transmitting via antenna 302. RF signals are received through antenna 302 by RF receiver 308. In embodiments in which a polling scheme is employed, RF receiver 308 includes an address discriminator for comparing addresses of transceivers to be interrogated by central processor 110. Particular RF transmit and receive circuitries are well known to one ordinarily skilled in RF communications and are therefor not detailed herein. Level detector 312 detects the signal strength of the received signal. Preferably, a capacitor resistor network (not shown) is used to capture the signal level received from RF receiver 308. Operational amplifiers connected to the capacitor resistor network having different threshold settings can be used to report different signal levels. The received signal is conditioned through receiver conditioner 314, which includes demodulation and conversion circuitry for converting received data to a format readable by processor 300 for processing. Infrared diode 316 receives infrared signals. LAN based transceiver modules or cart transceivers include keypad 322 for facilitating entry of data including transceiver ID. Display 320 displays entered data or programmed conditions. Interface 324 includes a RS 232 type or EIA 422 interface used to connect to a local area network. Power is supplied from wire or outlet and in portable transceivers, power can be provided by battery (not shown). The transceiver modules can also be equipped with transmitting diodes 330 for transmitting data through infrared transmit conditioner 332.

Figure 4A:
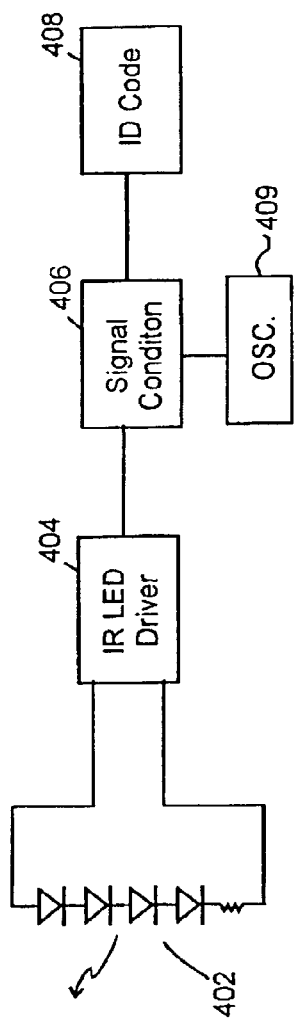
FIG. 4A illustrates an overall block diagram of a badge unit according to the present invention.

FIG. 4A shows the major components of the badge infrared transmitter. The badges are preferably disposable and is of a sufficiently small size such that it could be embedded or housed within the name tags given to convention attendees. In the disposable version, ID code 408 can be a number code set by jumper wires to power or ground. The ID data is forwarded to signal conditioner 406, which formats the data, such as by use of a frequency modulator, for transmission through IR LED driver 404 and LEDs 402. Oscillator 409 turns on signal conditioner to transmit data periodically, preferably every 3 to 4 seconds. In an alternative embodiment, the ID code 408 can be generated by a microprocessor with the ID code stored in memory associated with the processor. The badges are powered by battery (not shown).

Figure 4B:
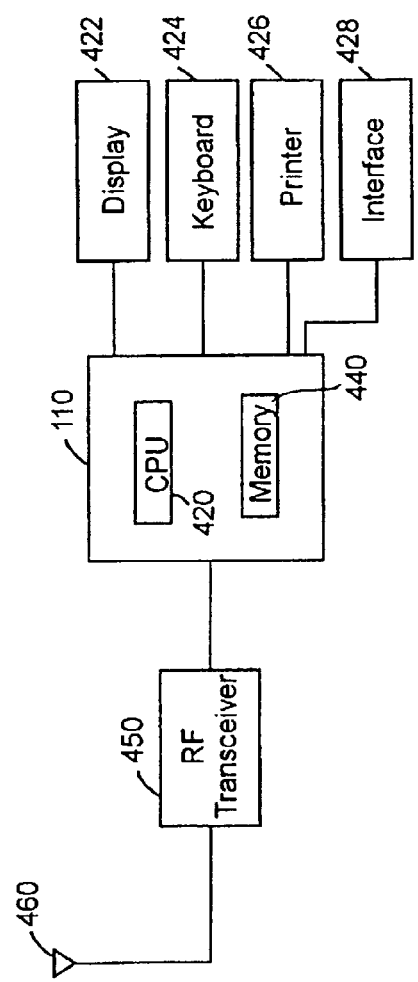
FIG. 4B illustrates a central processor according to the present invention.

FIG. 4B shows a block diagram of a central processor 110 according to the present invention. Central processor 110 is preferably a workstation type computer having CPU 420 and associated memory 440, having stored programs and commands executable by CPU 420 to operate the locator system. Signals transmitted from transceiver modules are received from antenna 460 through RF transceiver 450 from portable transceivers. Transceiver module data are also received through the local area network and interface 428. Stored programs in memory 440 are also used to process signals received from RF transceiver 450 and interface 428. Central processor 110 has an internal real time clock to facilitate time stamping of the received data when appropriate. Display 422 and keyboard 424 interfaces to system user and printer 426 prints data output from central processor 110, including the archival listings and reports.

FIG. 5 is an exemplary listing of the data generated by the system from the convention settings of FIGS. 1 and 1A. A listing of the visits by individuals at a particular booth is shown and the times at which the particular products viewed or visited as recorded by the system is shown. An archival data of the dates the persons visited, the company the person is from, the durations of visits, and the number of visits are examples of data which may be helpful for an exhibitor. The exhibitor can use the listing to identify the attendees having interest in which products. The listing includes the company from which the attendees are from. Such information may be helpful in identifying potential purchasers and competitors. The operator of the convention or the trade show can employ the locator system to collect data and provide such data to exhibitors as a service and/or for fee.

FIG. 6 shows similar data collectible from shopping carts in a supermarket. Such data would be useful for market analysts to determine the popularity of different goods, to study traffic pattern within the supermarket, and to monitor the efficiency at checkout counters.

It will be understood that various modifications can be made to the embodiments of the present invention herein disclosed without departing from the spirit and scope of the invention as defined by the claims appended hereto.

What is claimed is:

1. A method of collecting location data comprising:
   associating each of a plurality of objects and persons to a respective one of a plurality of badges, each of the badges having a unique identification code;
   transmitting a first signal including the unique identification code from a badge;
   receiving the first signal by a first receiver at a location having a location identifier;
   wirelessly transmitting a second signal including information representing the received unique identification code and the location identifier;
   receiving the second signal at a second receiver;
   forwarding the second signal from the second receiver to a central processor;
   recording the second signal information; and
   determining a location of at least one of the object and the person, wherein the step of receiving the second signal includes the step of receiving a plurality of second signals, further comprising determining a strength of the first signal and a time at which the first signal was received, the second signal also includes a reception time and a signal strength of the first signal, and wherein the determining step includes determining whether two second signals include the same received identification code and substantially equal reception times, comparing the signal strengths of the two second signals to determine the greater signal strength, and determining a location of one of a person and an object based on the second signal having the greater signal strength.

2. The method of claim 1, further comprising the step of: forwarding the signals received from the badge to the receiver which forwards the signals to the central processor.

3. The method of claim 2, wherein a central processor determines from a signal received from a transceiver a location of one of the person and the object, a time that the identification code was received, which one of the plurality of transceivers received the signal, and a duration of receipt of the same identification code by the same transceiver.

4. The method of claim 2, further comprising the steps of receiving the identification code via an IR signal, performing an IR to digital conversion of the identification code, and wirelessly forwarding receiver.

5. The method of claim 4, wherein the transceiver transmitter wirelessly forwards the signal to the receiver via an RF signal.

6. The method of claim 2, wherein the receiver is coupled to the central processor via a wired connection.

7. The method of claim 2, wherein the receiver is coupled to the central processor via a network.

8. The method of claim 2, wherein each of the plurality of transceivers has a location identification code associated therewith.

9. The method of claim 2, wherein central processor also determines from the signals received from the transceivers a travel pattern of at least one of the person and the object being monitored.

10. The method of claim 2, wherein the transceivers wirelessly transmit the signals to the receiver in response to a request received from the central processor.

11. The method of claim 1, further comprising determining a time at which the first signal was received, including a reception time of the first signal in the second signal, and determining a duration of stay of one of the object and person at the location.

12. The method of claim 1, further comprising determining a strength of the first signal, and including a signal strength of the first signal in the second signal.

13. The method of claim 1, wherein the step of wirelessly transmitting a second signal is performed in response to a request.

14. The method of claim 1, wherein the first signal is an IR signal.

15. The method of claim 14, wherein the first signal is converted to digital to become part of the second signal.

16. The method of claim 1, wherein the second signal is an RF signal.

17. The method of claim 1, further comprising determining a travel pattern of at least one of the person and the object.

18. The method of claim 1, further comprising the steps of:
   transmitting a signal including a unique identification code;
   storing a list of each badge, its identification code, and one of a person or an object associated with each badge, and
   receiving the identification code and a transceiver transmitter for wirelessly forwarding signals to a transceiver.

* * * * *